US012563414B2

(12) United States Patent
Ali-Tolppa et al.

(10) Patent No.: US 12,563,414 B2
(45) Date of Patent: Feb. 24, 2026

(54) APPARATUS, METHODS, AND COMPUTER PROGRAMS FOR NETWORK AUTOMATION

(71) Applicant: NOKIA SOLUTIONS AND NETWORKS OY, Espoo (FI)

(72) Inventors: Janne Tapio Ali-Tolppa, Taufkirchen (DE); Stephen Mwanje, Dorfen (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 366 days.

(21) Appl. No.: 18/028,699

(22) PCT Filed: Oct. 22, 2020

(86) PCT No.: PCT/EP2020/079792
§ 371 (c)(1),
(2) Date: Mar. 27, 2023

(87) PCT Pub. No.: WO2022/083870
PCT Pub. Date: Apr. 28, 2022

(65) Prior Publication Data
US 2023/0370868 A1 Nov. 16, 2023

(51) Int. Cl.
*H04W 24/02* (2009.01)
*H04W 24/08* (2009.01)

(52) U.S. Cl.
CPC ........... *H04W 24/02* (2013.01); *H04W 24/08* (2013.01)

(58) Field of Classification Search
CPC ......... H04L 12/28; H04L 12/50; H04W 24/02

USPC ................................ 370/329, 401, 402, 405
See application file for complete search history.

(56) References Cited

U.S. PATENT DOCUMENTS

| | | | |
|---|---|---|---|
| 2016/0028670 A1* | 1/2016 | Lott ................... | H04L 12/2834 |
| | | | 709/204 |
| 2016/0094420 A1 | 3/2016 | Clemm et al. | |
| 2019/0303905 A1* | 10/2019 | Sanchez-Llorens ..... | G07G 1/01 |
| 2020/0314672 A1 | 10/2020 | Farooq | |

OTHER PUBLICATIONS

International Search Report and Written Opinion dated Jun. 28, 2021 corresponding to International Patent Application No. PCT/EP2020/079792.
3GPP TR 23.791 V16.2.0 (Jun. 2019), Technical Report, 3rd Generation Partnership Project; Technical Specification Group Services and System Aspects; Study of Enablers for Network Automation for 5G (Release 16), Jun. 2019.

* cited by examiner

*Primary Examiner* — Dang T Ton
(74) *Attorney, Agent, or Firm* — Carter, DeLuca & Farrell LLP

(57) ABSTRACT

There is provided an apparatus arranged to: receive, from a configuration controller, a request for feedback on a network configuration in a communications network; request feedback on the network configuration from a plurality of network critic functions; aggregate feedback received from at least part of the plurality of network critic functions in response to the request; and provide the aggregated feedback to the configuration controller.

1 Claim, 10 Drawing Sheets

200

204

202

203

201

402     400a     400b     402

APPARATUS, METHODS, AND COMPUTER PROGRAMS FOR NETWORK AUTOMATION

FIELD

The present disclosure relates to apparatus, methods, and computer programs, and in particular but not exclusively to apparatus, methods and computer programs for network apparatuses.

BACKGROUND

A communication system can be seen as a facility that enables communication sessions between two or more entities such as user terminals, access nodes and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Content may be multicast or uni-cast to communication devices.

A user can access the communication system by means of an appropriate communication device or terminal. A communication device of a user is often referred to as user equipment (UE) or user device. The communication device may access a carrier provided by an access node, and transmit and/or receive communications on the carrier.

The communication system and associated devices typically operate in accordance with a required standard or specification which sets out what the various entities associated with the system are permitted to do and how that should be achieved. Communication protocols and/or parameters which shall be used for the connection are also typically defined. One example of a communications system is UTRAN (3G radio). Another example of an architecture that is known is the long-term evolution (LTE) or the Universal Mobile Telecommunications System (UMTS) radio-access technology. Another example communication system is so called 5G radio or new radio (NR) access technology.

SUMMARY

According to a first aspect, there is provided a network apparatus comprising: means for receiving, from a configuration controller, a request for feedback on a network configuration in a communications network; means for requesting feedback on the network configuration from a plurality of network critic functions; means for aggregating feedback received from at least part of the plurality of network critic functions in response to the request; and means for providing the aggregated feedback to the configuration controller.

The network configuration may not yet have been deployed in the communications network.

The network configuration may have already been deployed in the communication network.

The network apparatus may comprise means for receiving a registration request for registering a network critic function, the registration request comprising a scope of feedback that may be provided by said network critic function; and means for causing the said network critic function to be registered with said scope. The network apparatus may comprise means for selecting said network critic function to be as part of the plurality of network critic functions in dependence on said scope.

The network apparatus may comprise means for generating feedback on the network configuration to form generated feedback, wherein the means for aggregating feedback comprises means for aggregating the received feedback with the generated feedback.

The network apparatus may comprise means for implementing an interface to the controller via which the request for feedback on a network configuration in a communications network is received.

The network apparatus may comprise means for implementing a registration interface to the plurality of network critic functions.

The network apparatus may comprise means for implementing a feedback interface to the plurality of network critic functions for requesting feedback on the network configuration from a plurality of network critic functions.

The feedback received from each of the at least part of the plurality of network critic functions in response to the request comprises a respective value indicating how a particular action deployed or to be deployed by a first network automation function in the communications network has or will affect the network conditions of other network automation functions in the communications network.

The network apparatus may comprise means for aggregating weights feedback received from different network critic functions differently to form the aggregated feedback.

According to a second aspect, there is provided a method for a network apparatus, the method comprising: receiving, from a configuration controller, a request for feedback on a network configuration in a communications network; requesting feedback on the network configuration from a plurality of network critic functions; aggregating feedback received from at least part of the plurality of network critic functions in response to the request; and providing the aggregated feedback to the configuration controller.

The network configuration may not yet have been deployed in the communications network.

The network configuration may have already been deployed in the communication network.

The method may comprise receiving a registration request for registering a network critic function, the registration request comprising a scope of feedback that may be provided by said network critic function; and causing the said network critic function to be registered with said scope. The method may comprise selecting said network critic function to be as part of the plurality of network critic functions in dependence on said scope.

The method may comprise generating feedback on the network configuration to form generated feedback, wherein the aggregating feedback comprises aggregating the received feedback with the generated feedback.

The method may comprise implementing an interface to the controller via which the request for feedback on a network configuration in a communications network is received.

The method may comprise implementing a registration interface to the plurality of network critic functions.

The method may comprise implementing a feedback interface to the plurality of network critic functions for requesting feedback on the network configuration from a plurality of network critic functions.

The feedback received from each of the at least part of the plurality of network critic functions in response to the request comprises a respective value indicating how a particular action deployed or to be deployed by a first network automation function in the communications network has or will affect the network conditions of other network automation functions in the communications network.

The method may comprise aggregating weights feedback received from different network critic functions differently to form the aggregated feedback.

According to a third aspect, there is provided a network apparatus comprising: at least one processor, and at least one memory comprising computer code that, when executed by the at least one processor, causes the network apparatus to: receive, from a configuration controller, a request for feedback on a network configuration in a communications network; request feedback on the network configuration from a plurality of network critic functions; aggregate feedback received from at least part of the plurality of network critic functions in response to the request; and provide the aggregated feedback to the configuration controller.

The network configuration may not yet have been deployed in the communications network.

The network configuration may have already been deployed in the communication network.

The network apparatus may be caused to receive a registration request for registering a network critic function, the registration request comprising a scope of feedback that may be provided by said network critic function; and cause the said network critic function to be registered with said scope. The network apparatus may be caused to select said network critic function to be as part of the plurality of network critic functions in dependence on said scope.

The network apparatus may be caused to generate feedback on the network configuration to form generated feedback, wherein the aggregating feedback comprises aggregating the received feedback with the generated feedback.

The network apparatus may be caused to implement an interface to the controller via which the request for feedback on a network configuration in a communications network is received.

The network apparatus may be caused to implement a registration interface to the plurality of network critic functions.

The network apparatus may be caused to implement a feedback interface to the plurality of network critic functions for requesting feedback on the network configuration from a plurality of network critic functions.

The feedback received from each of the at least part of the plurality of network critic functions in response to the request comprises a respective value indicating how a particular action deployed or to be deployed by a first network automation function in the communications network has or will affect the network conditions of other network automation functions in the communications network.

The network apparatus may be caused to aggregate weights feedback received from different network critic functions differently to form the aggregated feedback.

According to a fourth aspect, there is provided a network apparatus comprising: receiving circuitry for receiving, from a configuration controller, a request for feedback on a network configuration in a communications network; requesting circuitry for requesting feedback on the network configuration from a plurality of network critic functions; aggregating circuitry for aggregating feedback received from at least part of the plurality of network critic functions in response to the request; and providing circuitry for providing the aggregated feedback to the configuration controller.

The network configuration may not yet have been deployed in the communications network.

The network configuration may have already been deployed in the communication network.

The network apparatus may comprise receiving circuitry for receiving a registration request for registering a network critic function, the registration request comprising a scope of feedback that may be provided by said network critic function; and causing circuitry for causing the said network critic function to be registered with said scope. The network apparatus may comprise selecting circuitry for selecting said network critic function to be as part of the plurality of network critic functions in dependence on said scope.

The network apparatus may comprise generating circuitry for generating feedback on the network configuration to form generated feedback, wherein the aggregating circuitry for aggregating feedback comprises aggregating circuitry for aggregating the received feedback with the generated feedback.

The network apparatus may comprise implementing circuitry for implementing an interface to the controller via which the request for feedback on a network configuration in a communications network is received.

The network apparatus may comprise implementing circuitry for implementing a registration interface to the plurality of network critic functions.

The network apparatus may comprise implementing circuitry for implementing a feedback interface to the plurality of network critic functions for requesting feedback on the network configuration from a plurality of network critic functions.

The feedback received from each of the at least part of the plurality of network critic functions in response to the request comprises a respective value indicating how a particular action deployed or to be deployed by a first network automation function in the communications network has or will affect the network conditions of other network automation functions in the communications network.

The network apparatus may comprise aggregating circuitry for aggregating weights feedback received from different network critic functions differently to form the aggregated feedback.

According to a fifth aspect, there is provided non-transitory computer readable medium comprising program instructions for causing a network apparatus to perform at least the following: receive, from a configuration controller, a request for feedback on a network configuration in a communications network; request feedback on the network configuration from a plurality of network critic functions; aggregate feedback received from at least part of the plurality of network critic functions in response to the request; and provide the aggregated feedback to the configuration controller.

The network configuration may not yet have been deployed in the communications network.

The network configuration may have already been deployed in the communication network.

The network apparatus may be caused to receive a registration request for registering a network critic function, the registration request comprising a scope of feedback that may be provided by said network critic function; and cause the said network critic function to be registered with said scope. The network apparatus may be caused to select said network critic function to be as part of the plurality of network critic functions in dependence on said scope.

The network apparatus may be caused to generate feedback on the network configuration to form generated feedback, wherein the aggregating feedback comprises aggregating the received feedback with the generated feedback.

The network apparatus may be caused to implement an interface to the controller via which the request for feedback on a network configuration in a communications network is received.

The network apparatus may be caused to implement a registration interface to the plurality of network critic functions.

The network apparatus may be caused to implement a feedback interface to the plurality of network critic functions for requesting feedback on the network configuration from a plurality of network critic functions.

The feedback received from each of the at least part of the plurality of network critic functions in response to the request comprises a respective value indicating how a particular action deployed or to be deployed by a first network automation function in the communications network has or will affect the network conditions of other network automation functions in the communications network.

The network apparatus may be caused to aggregate weights feedback received from different network critic functions differently to form the aggregated feedback.

According to a sixth aspect, there is provided a computer program comprising program instructions for causing a computer to perform any method as described above.

According to a seventh aspect, there is provided a computer program product stored on a medium may cause an apparatus to perform any method as described herein.

According to an eighth aspect, there is provided an electronic device that may comprise apparatus as described herein.

According to a ninth aspect, there is provided a chipset that may comprise an apparatus as described herein.

Various other aspects are also described in the following detailed description and in the attached claims.

BRIEF DESCRIPTION OF FIGURES

Embodiments will now be described, by way of example only, with reference to the accompanying Figures in which.

DETAILED DESCRIPTION

In the following certain embodiments are explained with reference to mobile communication devices capable of communication via a wireless cellular system and mobile communication systems serving such mobile communication devices. Before explaining in detail the exemplifying embodiments, certain general principles of a 5G wireless communication system are briefly explained with reference to FIG. 1.

Figure 1:
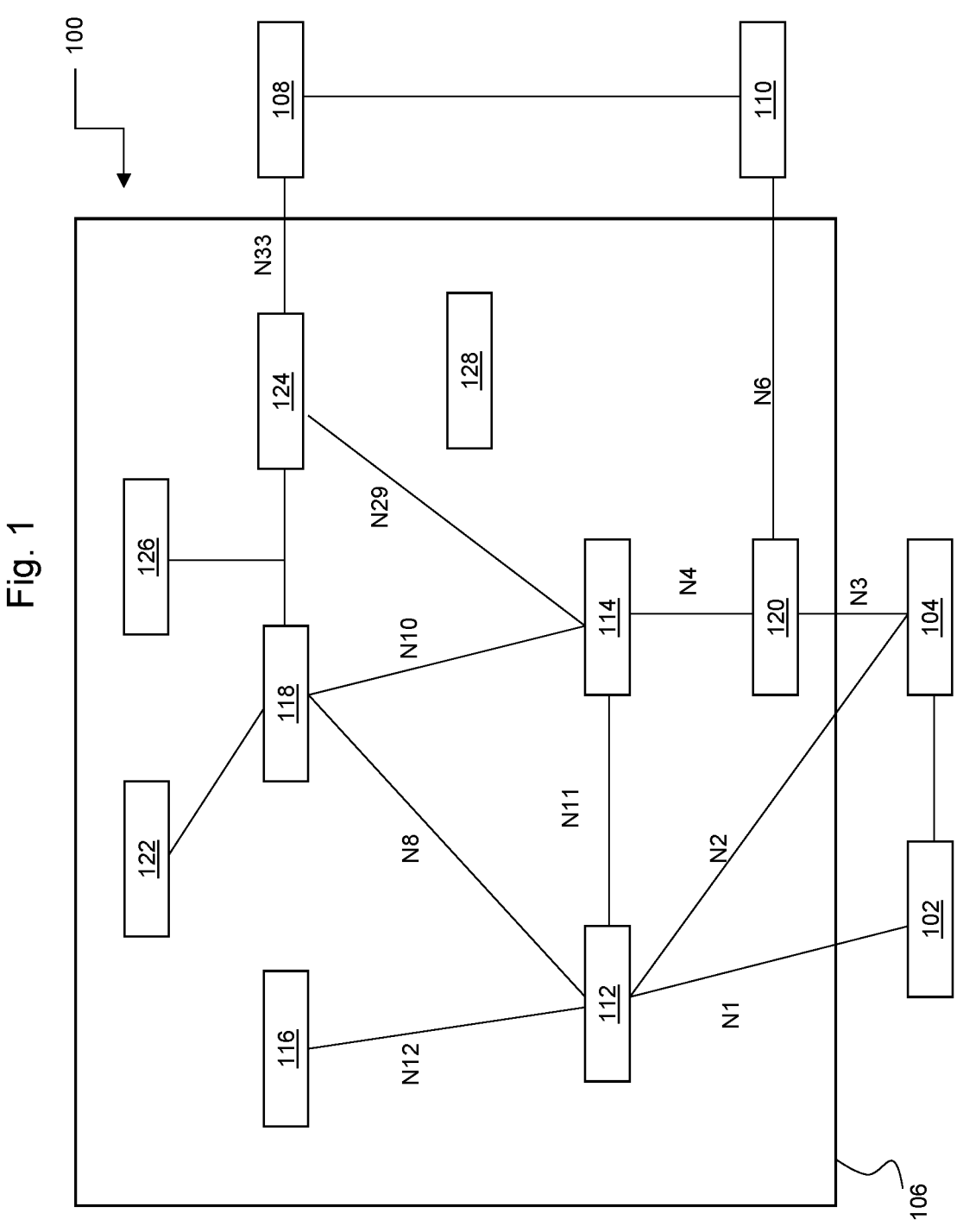
FIG. 1 shows a schematic representation of a 5G system.

FIG. 1 shows a schematic representation of a 5G system (5GS) 100. The 5GS may comprise a user equipment (UE) 102 (which may also be referred to as a communication device or a terminal), a 5G access network (AN) (which may be a 5G Radio Access Network (RAN) or any other type of 5G AN such as a Non-3GPP Interworking Function (N3IWF)/a Trusted Non3GPP Gateway Function (TNGF) for Untrusted/Trusted Non-3GPP access or Wireline Access Gateway Function (W-AGF) for Wireline access) 104, a 5G core (5GC) 106, one or more application functions (AF) 108 and one or more data networks (DN) 110.

The 5G RAN may comprise one or more gNodeB (gNB) distributed unit functions connected to one or more gNodeB (gNB) unit functions. The RAN may comprise one or more access nodes.

The 5GC 106 may comprise one or more access management functions (AMF) 112, one or more session management functions (SMF) 114, one or more authentication server functions (AUSF) 116, one or more unified data management (UDM) functions 118, one or more user plane functions (UPF) 120, one or more unified data repository (UDR) functions 122, one or more network repository functions (NRF) 128, and/or one or more network exposure functions (NEF) 124. Although NRF 128 is not depicted with its interfaces, it is understood that this is for clarity reasons and that NRF 128 may have a plurality of interfaces with other network functions.

The 5GC 106 also comprises a network data analytics function (NWDAF) 126. The NWDAF is responsible for providing network analytics information upon request from one or more network functions or apparatus within the network. Network functions can also subscribe to the NWDAF 126 to receive information therefrom. Accordingly, the NWDAF 126 is also configured to receive and store network information from one or more network functions or apparatus within the network. The data collection by the NWDAF 126 may be performed based on at least one subscription to the events provided by the at least one network function.

The 5GC (5G Core network) has been defined as a Service Based Architecture (SBA). Service-Based Architectures provide a modular framework from which common applications can be deployed using components of varying sources and suppliers. Control plane functionality and common data repositories of a 5G network may thus be delivered by way of a set of interconnected Network Functions (NFs), each with authorization to access each other's services, with Network Function (NF) service producers exposing services to NF service consumers. NFs may act as service consumers and/or service providers. NF service providers register their NF profile in a Network Repository Function (NRF). An NRF maintains an updated repository of 5G elements available in the operator's network, along with the services provided by each of the elements in the 5G core that are expected to be instantiated, scaled and/or terminated without or minimal manual intervention. In other words, the NRF maintains a record of available NF instances and their supported services. The NRF allows other NF instances to subscribe and be notified of registrations from NF instances of a given type. The NRF may support service discovery, by receipt of Discovery Requests from NF instances and details which NF instances support specific services. Therefore NF Service consumers or Service Communication Proxies (SCP) (which obtain NF services on behalf of another network entity) may discover NF service producers by performing for example, an NF Discovery procedure towards the NRF.

Several steps have recently been made in terms of network automation. Network automation is a process of automating at least one of the configuring, managing, testing, deploying and operating of physical and/or virtual devices within a network. This provides advantages to a network as everyday network tasks and functions may be delegated to respective network automation functions. Network automation functions may be present in both self-organising networks (SON) and cognitive networks. These types of networks will be discussed in turn.

SONs aim to provide a solution in which each network problem is addressed by a single SON function, and a single SON function may address multiple problems. An SON function is a closed control loop algorithm that acquires data from the network and uses the measurements contained in this data to determine or compute new configuration values for the network (element) according to a set of algorithm internal rules or policies (in the following, these configuration values will be called "network configurations"). In other words, the function is a state machine that matches inputs (network key performance indicators (KPIs) to outputs (network configurations). It has fixed behavior in that its input-output relationship, or the path thereto, is predesigned into the solution through the rules of the algorithm (for example, states and state transitions).

Management and coordination of multiple SON functions is performed in a hierarchical manner. For example, SON coordination and management may be performed by non-cognitive centralised functions according to rather fixed rules, or through policies that are created based on fixed rules and input from MNO and SON manufacturer.

Figure 5:
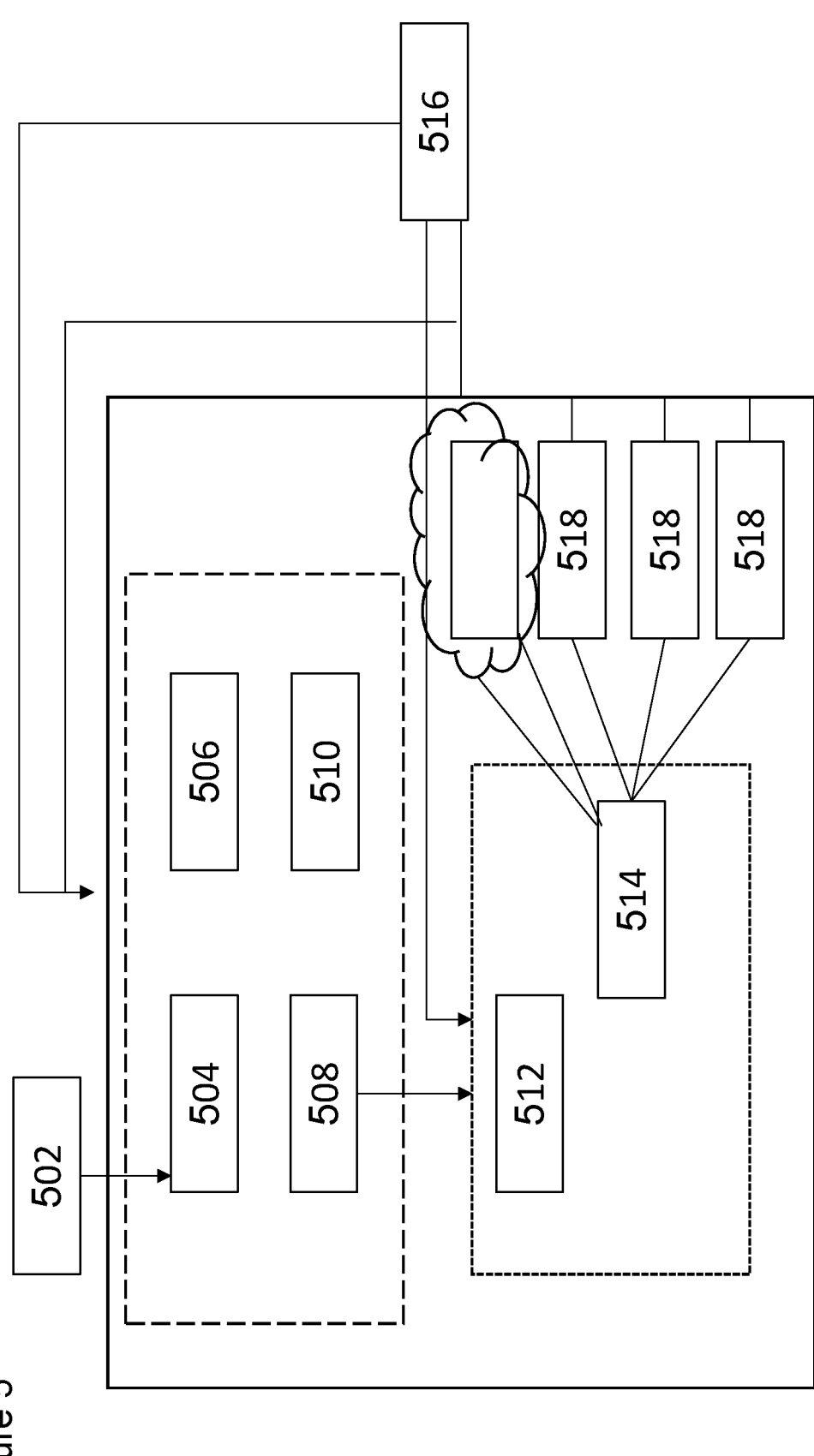
FIG. 5 shows an example of a Self-Organising Network.

FIG. 5 is block diagram of a system utilising an SON architecture. SON may operate (as may cognitive networks) in an environment 516 characterized by invisible, non-modeled static and dynamic characteristics that influence a defined set of KPIs. Examples of static characteristics include locality, base station location, operating technology and available spectrum. Examples of dynamic characteristics include velocity of apparatus, user count, number of applications accessing services, etc. Within an SON, the SON functions have a limited view on the environment, and use an external SON management that takes this view for them. Furthermore, this SON management only knows about pre-defined types of context, but cannot detect new ones.

Consequently, by relying on KPIs, as is the case with SON, the performance may be limited to how much the KPIs accurately measure and abstract the environment. Cognitive networks take the next step beyond this approach and infer more about the environment than just reading the KPIs. That is, cognitive networks allow cognitive network functions to detect within which context and in which environment the cognitive network functions work and to identify potential new context or a new environment. The same counts for services requirements.

Each SON "solution" to a network problem may involve implementing a decision matrix 514 that matches combinations of KPIs 512 to network configurations 518 (which, as described above, may be considered as function-internal states of the state machine). In this case, the network configuration, which is the output of the SON algorithm, is a particular combination of Network Configuration Parameters (NCPs). The function may consider the current network configuration as input to the decision-making process.

However, the function always has only one network configuration active at any one time, chosen from a limited set of possible network configurations.

The designer may choose to decouple some system-wide functionality, such as coordination 510 and verification 508, from the SON function itself and place it into a SON operation layer. This is because the same subset of NCPs may be subject to reconfiguration after being triggered by any of a plurality of different SON functions. For example, both Mobility Robustness Optimization (MRO) and Mobility Load Balancing (MLB) configure Cell-Individual Offset (CIO). Consequently, decisions of SON functions may be coordinated on a logically centralised level.

In contrast to self-organizing networks, cognitive networks learn from their operating history in and for different operating contexts in order to determine an optimal response for each context. They may therefore make better decisions than SONs in response to changing networks as they gather data on previous decisions.

With the success of SONs, but also its shortcomings in terms of flexibility and adaptability to changing and complex environments, there is a strong demand for more intelligence and autonomy in network Operations, Administration and Management (OAM) functions, and, consequently, for the use of cognitive autonomous networks within this core network level.

Different network automation functions may also be provided by different vendors and multiple network automation functions may exist within the cognitive autonomous networks system. Each of these functions may have a single objective, and propose recommendations and/or policy changes to be executed on the network. This is also the case for other types of network systems, such as SONs. The changes proposed changes are sometimes counterproductive, even when not necessarily conflicting, as a network automation function will often only consider the impact of the overall network, including on only a single network automation function.

Some SON systems have provided techniques for coordinating conflicting network automation functions. These coordinators are usually used as mediators whenever two network automation functions have a conflict. Such coordinators are not often used in a cognitive network as conflicts are dealt with by each network automation function continually evaluating a state of the network that they affect and adapting their operation in response to current network conditions. To this effect, network automation functions themselves may include functionality for providing some coordination between different functions performed by that network automation function. This coordination may also be restricted to parts of a network immediately influenced by that network automation function.

Another system that has been proposed to address coordination issues in cognitive networks is to use a metric known as Action Quality Indicators (AQIs). An AQI is some measurement of how a particular action by a first network automation function has affected the network conditions/operation of other network automation functions. For example, following an action from a given network automation function, peer network automation functions grade their observed effects, with the AQIs as a "grade". The peers then report these grades/AQIs to the network automation function that's made the change, which then aggregates them to learn how good or bad the action was on the entire network.

Current and future networks will for a long-time support both learning based Cognitive Functions and non-learningbased SON Functions, each with a single objective, for which the function proposes recommendations and/or policy changes to be executed on the network. Both kind of functions (which will both be referred to as Network Automation Functions (NAFs)) will thus have to coexist while attempting to ensure that desired end-end network performance objectives are achieved. The individual network function instances do not take responsibility for end-to-end performance. Instead a separate functionality may be responsible for the Control, Coordination and Configuration of these function instances, especially as the individual NAFs in a Cognitive Autonomous Network system are likely to be provided by multiple vendors.

Although increasing the degree or level of machine-learning-based network automation can improve the network performance, it may make it also less predictable than a rule-based system. With the NAF instances continuously learning and adapting to their context, their behaviour may constantly change to the extent that no prediction can be made externally about how they will respond to any particular network state. Moreover, the combined effect of several NAFs or NAF instances can particularly have unexpected side effects. As each NAF can have its own operational envelope, outside of which the NAF may not perform well, it is useful to coordinate the combined effect of the NAFs.

In addition to the coordination, it would be useful to be able restrict the automation within safe boundaries. However, both the coordination and related constraints may dynamically change with every deployed NAF, which means that any relatively static coordination or constraint management method would be unlikely to meet the requirements. Existing coordination and control functions are designed as closed systems that do not provide any means for dynamically deploying constraints into the cognitive network automation system. This applies especially to cases, where there are NAFs from different vendors or to deploying third party constraints into the network.

For example, in SONs, the functions are hand engineered and implemented with several control parameters that the operator could tune to adjust the behaviour of the SONs function. Finding the right configuration for the functions is then part of the deployment process of the SONs solution as a kind of a manual "learning" process. For cognitive functions, since the decision logic is built from learning, there may not be such parameters to control the decision logic.

There have been proposals for controlling and coordination functionality in network automation systems. The responsible functional unit, which may simply be called a controller, ensures that the individual functions do not cause adverse effects to one another and that they do not conflict for the network resources.

As one example, the controller of multiple network automation functions may be manifested by two functions; the Coordination engine and the Configuration Management Engine, which are respectively responsible for learning the coordination effects among the function and reconfiguring the functions in response to this learning to mitigate against poor network conditions. These two functions may be integrated into a single Control, Coordination and Configuration function (C3F) that is responsible for the end-to-end performance of the Cognitive Autonomous Network. A C3F may comprise functionality to: ensure proper concurrency control among cognitive functions; learn and implement coordination decisions among multiple cognitive functions; and (re)configure at least one cognitive function in line with the desired end to end goals. This network framework is illustrated with respect to FIG. 6.

Figure 6:
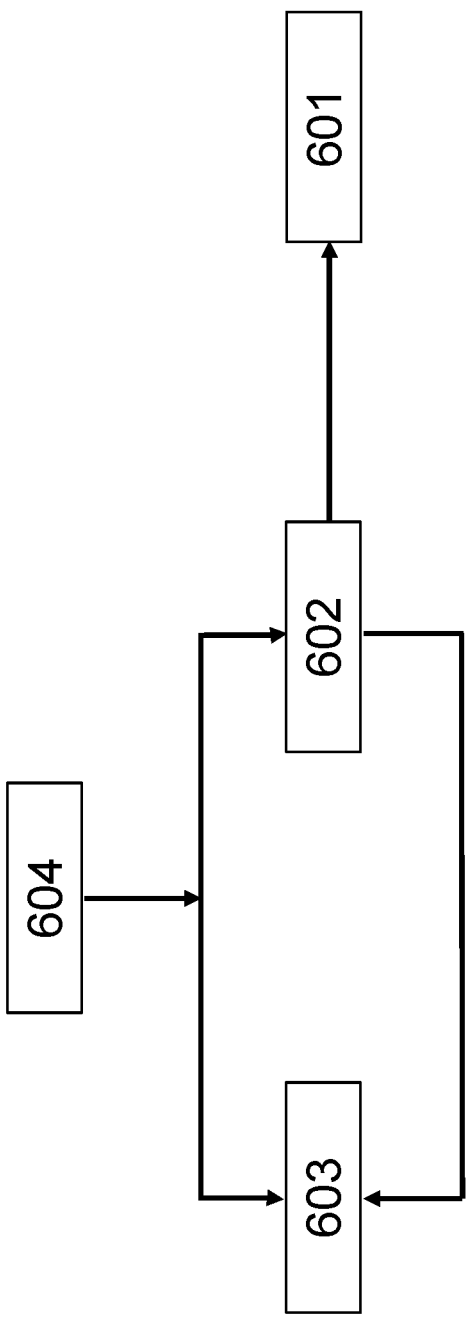
FIG. 6 shows an example network comprising a configuration controller.

FIG. 6 shows an access network 601 configured to receive (re)configuration information from a Configuration, Control and Coordination Function 602. The Configuration, Control and Coordination Function 602 may request that at least one Decision Application 603 make a decision on reconfiguring the network. Both the Configuration, Control and Coordination Function 602 and the at least one Decision application 603 may receive at least one indication of a network objective from a Network Objectives Manager 604. The Decision application 603 may use the at least one indication from the Network Objectives Manager 604 to form a decision in response to the request from the Configuration, Control and Coordination Function 602. This decision may then be signaled to the Configuration, Control and Coordination Function 602, which transmits any (re)configuration instructions to the Access Network 601 in response to this.

Thus, in general the configuration controller (such as Configuration, Control and Coordination Function 602) learns to coordinate the behaviour of individual network automation functions via a closed loop in which a given network automation function proposes a change on the network that is evaluated by the controller through the other NAFs and, based on which evaluation, the configuration controller advises the actor NAF on the proposed changes. The evaluation may be in form of an Action Quality Indicator (AQI).

As described above, according to the AQI concept, the peer functions grade the observed effects of an action from a given Cognitive Function using the AQIs as the grades. The peers then report these grades (the AQIs) to the given Cognitive Function, which then aggregates them to learn how good or bad the executed action was on the entire network.

However, these proposals have two major limitations.

First, the AQI concept is designed for feedback only after the action has been taken. It is not suitable for pre-action coordination. Traditionally, network automation system have been designed in a way that all necessary logic is implemented a priori. However, with cognitive systems that evaluate very large contexts, it may be beneficial to allow the operators to provide constraints to the automation system. Second, the control and coordination mechanisms have assumed a perfect controller that is able to independently learn the effects among the functions and devise the appropriate response. They do not provide any means for the operator to influence the control and coordination decisions or addition of multi-vendor constraints. Providing a flexible way to constrain those decisions is as such a critical addition that can be applied to both pre- and post-action coordination.

This present application introduces a framework that allows operators to provide such external constraints to the network automation system.

To support dynamic input of operator constraints into the control and coordination of cognitive network automation functions, including into the pre-action coordination, the following proposes and introduces an External Network Automation Critic Framework (ENACF). The ENACF requests feedback/criticism on a change in the network (which may be proposed or already deployed) from network functions herein known as critic functions. The critic functions respond with feedback on the change, which may then be aggregated by the ENACF to form the aggregated feedback that is provided to a controller/the C3F.

The ENACF thus enables critic functions that are external to the network automation system to evaluate and influence the performance of the network automation system. At least one of the critic functions may be a third party function. The proposed framework provides functions and interfaces that enable operators to dynamically deploy intelligent constraint functions, herein called Network Automation Critic Functions (NACFs), into a Configuration, Control and Coordination Function.

Figure 7:
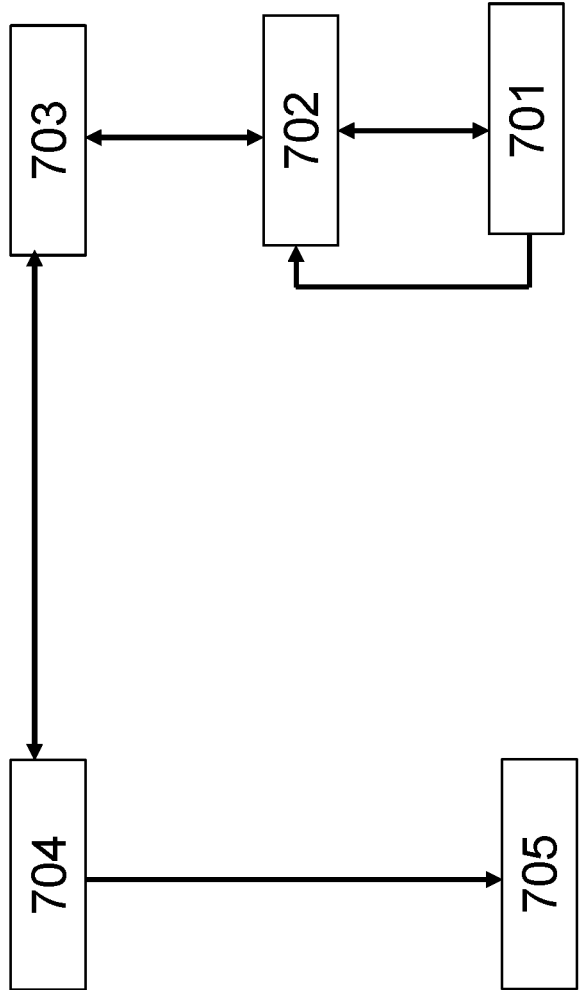
FIG. 7 shows an example network.

An example framework for providing the presently described techniques is illustrated with respect to FIG. 7.

FIG. 7 shows an NCAF 701 configured to interface with a Network Automation Critic Exposure Function (NACEF) 702. In turn, the NACEF 702 may communicate with a Configuration, Control and Coordination Function 703, which communicates with a Network Automation Function 704. The Network Automation Function 704 may communicate with a network 705, which may comprise an access node such as, for example, a gNB.

When a Network Automation Function 704 wants to make a change in the network (aka a reconfiguration), the Network Automation Function 704 sends a change request for this to the Control Coordination and Configuration Function 703.

In response to receipt of this change request, as a part of its coordination process the Control Coordination and Configuration Function 703 asks for feedback for the proposed change from the NACEF 702 using a Network Automation Critic Exposure Service (NACES) implemented by the NACEF 702 over an interface between the NACEF 702 and the Control Coordination and Configuration Function 703.

The NACEF 702 may determine at least one NACF 701 that is able to provide feedback and/or criticism on the requested change, and request their criticism and feedback for the requested change.

The NACEF 702 may determine which NACFs 701 to ask for feedback and/or criticism of a requested change utilizing registration information. In other words, the at least one NACF 701 may have previously register themselves with the NACEF 702, and the NACEF 702 may determine the at least one NACF from this registration. Any number of NACF instances may be registered by the NACEF 702. Each NACF 701 may be configured to critic only certain aspects of the network. In such cases, the registration for a particular NACF 701 may include information on at least one aspect of the network that may be critiqued by that NACF 701. The interface between NACF 701 and NACEF 702 may abstract the NACF 701 so that it does not have to be defined a priori. An NACF 701 can vary from a simple rule-based constraint to a complex machine learning model with state and memory. An NACF 701 may be a Network Automation Function, meaning that it is also optimizing an aspect of the network it's designed to optimize. The NACF 701 may be a pure critic or constraint function, which doesn't optimize the network itself.

The feedback and/or criticism given via the interface between the NCAF 701 and NACEF 702 may utilize the Action Quality Indicator (AQI) concept. Response(s) from NCAFs 701 to this request for criticism/feedback may be aggregated by the NACEF 702. This helps to determine an overall picture of the effect of a change. The NACEF may also implement an interface, through which the Control Coordination and Configuration Function 703 may request the aggregated feedback from the NACEF 702. The Control Coordination and Configuration Function 703 may use the feedback to control a decision to accept or reject a change proposed/requested by an NAF 704. This decision may thus be communicated to NAF 704. If any requested/proposed changes are accepted, the NAF 704 may communicate this to network 705.

The proposed NACEF 702 may thus enable the dynamic introduction of constraints into the network automation at operational phase, which includes the introduction of third party constraints, for example by the operator. The NACFs 701 may also enable dynamic deployment of coordination feedback logic into the Control Coordination and Configuration Function 703.

Figure 10:
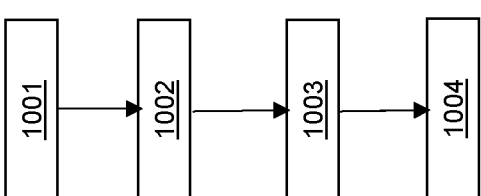
FIG. 10 is a flow chart showing operations of a network apparatus.

The following will describe some specific examples of how certain features may be implemented before a more general view is presented with reference to FIG. 10. However, it is understood that aspects of the following specific examples may also be applied in other networks in which analogous technical problems exist.

First, the interfaces between the NACEF 702 and the NACF 701 and the Control Coordination and Configuration Function 703 and the NACEF 702 are considered.

On both of these interfaces, a feedback request may be made. The feedback request may request feedback and/or criticism to a proposed change in the network configuration. The feedback request may be made from the Control Coordination and Configuration Function 703 to the NACEF 702. The feedback request may be made from the NACEF 702 to the NACF 701.

The feedback request may comprise at least one of a number of different factors. For example, the feedback request may comprise information on the scope (in terms of time and Network Functions) of the processing performed by the requesting Network Automation Function to derive the reconfiguration recommendation. As another example, the feedback request may comprise information on the scope (in terms of time and Network Functions) for the reconfiguration to be performed. The feedback request may comprise an indication of the parameters proposed for reconfiguration with both current and proposed new values. As a specific example, these parameters may relate to the 3GPP SA5 Network Resource Model, with possible vendor specific containers for vendor specific parameter. As another example, the feedback request may comprise a deployment plan for the reconfigurations, for example, when the changes are intended to be deployed or when they were deployed. As another example, the feedback request may comprise context for the response, which may comprise a time by when a response to the feedback request is required.

The feedback response from NACF 701 may comprise at least one of a number of different factors. For example, the feedback request may comprise at least one Action Quality Indicator value. As another example, the feedback request may comprise a confidence and/or an importance value.

Additionally, an NACF 701 may collect and use extra network and environment data. This extra data may be used to derive at least part of the response to the feedback request. Examples of the types of extra data that may be collected and used include Network Function Key Performance Indicators, User Equipment measurements and/or User Equipment trace data, and other context data like road traffic, etc.

The NACF 701 may also register with the NACEF 702 using a registration request. The registration request may include at least one of a plurality of different types of information for registration purposes. For example, the registration request may comprise an indication of the scope of interest of the NACF 701, which may coincide with the validity or measurement area, in case the NACF is also a Network Automation Function. As another example, the registration request may comprise a list of input features (e.g. Key Performance Indicators) of the Network Automation Function. As another example, the registration request may comprise a list of configuration parameters optimized by the Network Automation Function.

After receiving a feedback request from a Control Coordination and Configuration Function 703, the NACEF 702 may evaluate the proposed control action. When evaluating a proposed control action, the NACEF 702 may request all registered NACFs to evaluate the proposed control action. As mentioned above, the critic registration may include a scope of interest. The request may be sent only to NACFs 701 having a scope of interest that at least partially overlies an affected scope of the proposed control action.

After receiving feedback from at least one of the requested NACFs 701 in response to the feedback request, the NACEF 701 aggregates the received feedback from all the NACFs within the scope and provides the aggregated feedback to Control Coordination and Configuration Function 703. It may be understood that as both NACFs 701 and the NACEF 702 may provide the same interface, in one example several NACEFs 702 may be nested. In other words, one NACEF may request feedback from another NACEF over the interface it provides. Because this feedback request is abstracted by the interface, from the point of view of the requesting NACEF, the other NACEF will appear like any other NACEF. This enables a hierarchical collection feedback and a single NACEF does not need to be able to collect all feedback by itself.

Figure 8:
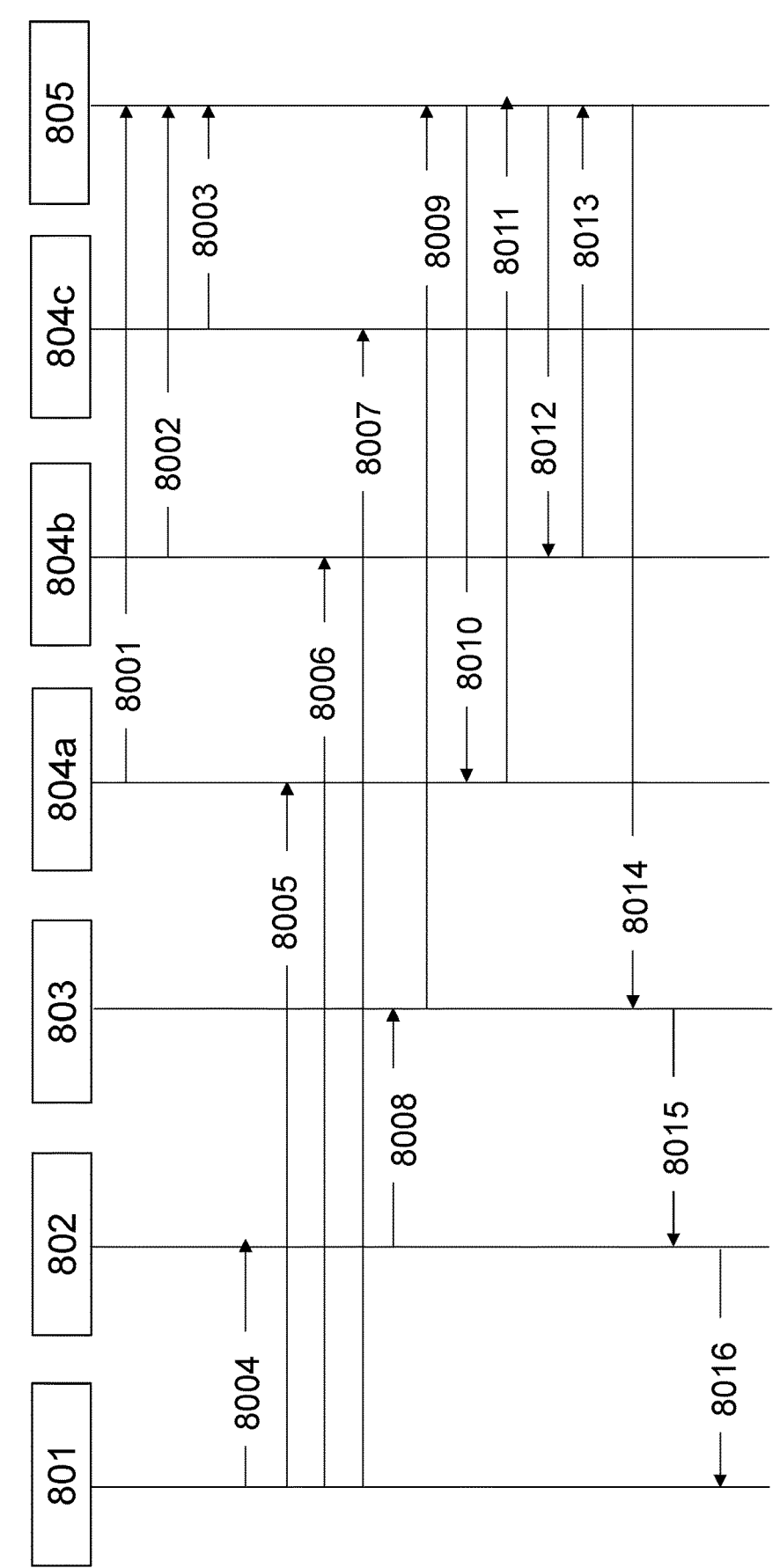
FIGS. 8 and 9 show example signaling that may be performed between network elements.

The following will consider an example in which a proposed action is evaluated before it has been implemented with reference to FIG. 8.

FIG. 8 is a signaling diagram showing potential signals that may be exchanged between various network elements. In particular, FIG. 8 shows a network function 801, a network automation function 802, a Control Coordination and Configuration Function 803, a first NACF 804a, a second NACF 804b, a third NACF 804c and an NACEF 805.

At 8001, the first NACF 804a transmits a registration request to the NACEF 805. In response to receipt of this request, the NACEF 805 registers the first NACF 804a. The registration request may comprise the scope of the first NACF 804a.

At 8002, the second NACF 804b transmits a registration request to the NACEF 805. In response to receipt of this request, the NACEF 805 registers the second NACF 804b. The registration request may comprise the scope of the second NACF 804b.

At 8003, the third NACF 804c transmits a registration request to the NACEF 805. In response to receipt of this request, the NACEF 805 registers the third NACF 804c. The registration request may comprise the scope of the third NACF 804c.

At 8004, the network function 801 signals data it has collected to the network automation function 802. This is because the network function 801 is within a measurement area of the network automation function 802.

At 8005, the network function 801 signals data it has collected to the first NACF 804a. This is because the network function 801 is within a measurement area of the first NACF 804a.

At 8006, the network function 801 signals data it has collected to the second NACF 804b. This is because the network function 801 is within a measurement area of the second NACF 804b.

At 8007, the network function 801 signals data it has collected to the third NACF 804c. This is because the network function 801 is within a measurement area of the third NACF 804c.

At 8008, the Network Automation Function 802 signals a proposed (re)configuration for the network to the Control Coordination and Configuration Function 803. This proposed action may be based on the data received at 8005.

At 8009, the Control Coordination and Configuration Function 803 signals a feedback request to the NACEF 805 for feedback on the proposed (re)configuration. In response to this feedback request, the NACEF 805 identifies NACFs that fall within the scope of the proposed change. For the purposes of this example, this corresponds to the first NACF 804a and the second NACF 804b.

At 8010, the NACEF 805 sends a feedback request for the proposed change to the first NACF 804a.

At 8011, the first NACF 804a signals feedback for the proposed change to the NACEF 805. An example metric value for this feedback is an AQI value.

At 8012, the NACEF 805 sends a feedback request for the proposed change to the second NACF 804b.

At 8013, the second NACF 804b signals feedback for the proposed change to the NACEF 805. An example metric value for this feedback is an AQI value. The NACEF 805 may then aggregate the feedback received from the first NACF 804a and the second NACF 804b.

At 8014, the NACEF 805 signals the aggregated feedback for the proposed change to the Control Coordination and Configuration Function 803. In the aggregation, feedback from different NACFs may be weighed differently.

At 8015, the Control Coordination and Configuration Function 803 determines whether to accept or reject the change based on at least the aggregated feedback received at 8014, and signals the result of this determination to the network automation function 802. The Control Coordination and Configuration Function 803 may evaluate the proposed action based on the response it received from the NACEF 805, whether to deploy the control action or not.

At 8016, if a proposed change was accepted at 8015, the network automation function signals at least one network function 801 to deploy the new/accepted configuration. It is understood that the proposed change may be activated on to the network by the Control Coordination and Configuration Function.

Figure 9:
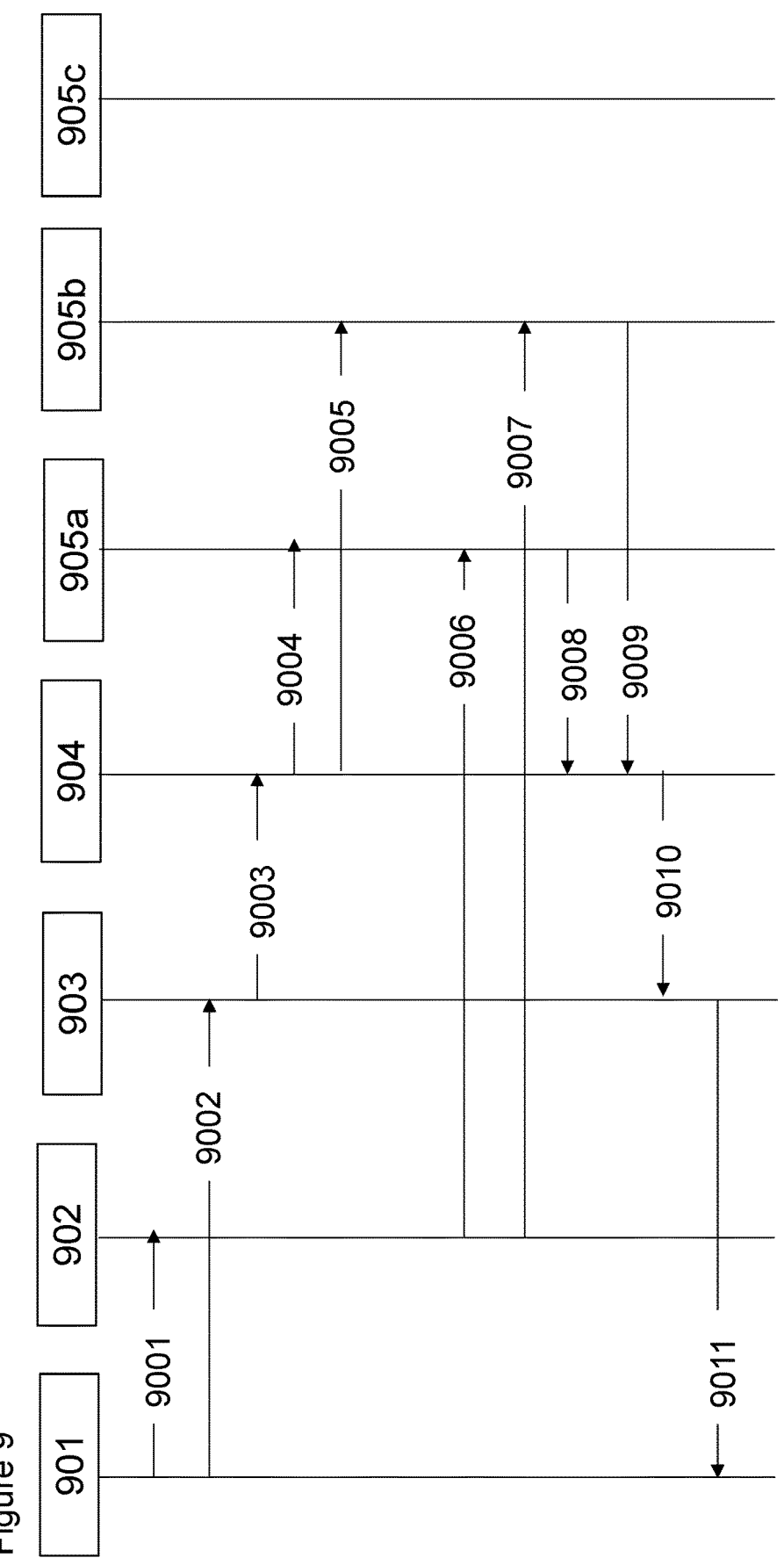

The following will consider an example in which a proposed action is evaluated after it has been implemented/deployed with reference to FIG. 9.

FIG. 9 is a signaling diagram showing potential signals that may be exchanged between various network elements. In particular, FIG. 9 shows a network automation function 901, a network function 902, a Control Coordination and Configuration Function 903, an NACEF 904, a first NACF 905a, a second NACF 905b, and a third NACF 904c. FIG. 9 does not show the registration process illustrated with respect to FIG. 8. However, it is understood that the registration may have already happened. Moreover, it is understood that the example of FIG. 9 may follow on from the last step of FIG. 8, such that the newly accepted change of 8016 is the change being evaluated in FIG. 9.

At 9001, the Network Automation Function 901 signals the network function 902 to deploy a configuration change. This may correspond to step 8016 of FIG. 8. Alternatively, 9001 may be performed in response to a different change mechanism.

At 9002, the Network Automation Function 901 signals the Control Coordination and Configuration Function 903 to inform the Control Coordination and Configuration Function 903 that the configuration change of 9001 has been instructed.

At 9003, the Control Coordination and Configuration Function 903 signals a feedback request for the indicated change of 9002 to the NACEF 904. In response to this signaling, the NACEF 904 determines those registered NACFs 905a-c that are registered as being within the scope of the deployed change. In the present case, the first NACF 905a and the second NACF 905b are determined to be within the scope of the deployed change. This signaling may form at least part of a plurality of post-action coordination processes performed by the Control Coordination and Configuration Function 903.

At 9004, the NACEF 904 requests feedback on the deployed change from the first NACF 905a.

At 9005, the NACEF 904 requests feedback on the deployed change from the second NACF 905b.

At 9006, the first NACF 905a collects data relating to the deployed change from the network function 902 deploying at least part of the change. The first NACF 905a may be aware that it is collecting data for post-action feedback (e.g. via the message signaled at 9004).

At 9007, the second NACF 905b collects data relating to the deployed change from the network function 902 deploying at least part of the change. The second NACF 905b may be aware that it is collecting data for post-action feedback (e.g. via the message signaled at 9005).

At 9008, the first NACF 905a signals a response to the feedback request of 9004 to the NACEF 904. This response is based on the data collected at 9006. Similar to FIG. 8, the feedback responses may comprise any appropriate metric, such as, for example, an AQI value.

At 9009, the second NACF 905b signals a response to the feedback request of 9005 to the NACEF 904. This response is based on the data collected at 9007. Similar to FIG. 8, the feedback responses may comprise any appropriate metric, such as, for example, an AQI value. The NACEF 904 may aggregate the responses of 9008 and 9009 (using the same or different weighting for different NACFs) to form aggregated feedback.

At 9010, the NACEF 904 may signal the aggregated feedback to the Control Coordination and Configuration Function 903. The Control Coordination and Configuration Function 903 may use at least the aggregated feedback to determine whether to maintain or reverse the deployed change.

At 9011, the Control Coordination and Configuration Function 903 signals the result of the determination of whether to maintain or reverse the deployed change to the Network Automation Function 901. If the decision is to maintain the deployed change, the Network Automation Function 901 may take no further action with respect to that deployed change until the network conditions change again. If the decision is to revert the deployed change, the Network Automation Function 901 may signal the Network Function 902 to reconfigure the parameters affected by the deployed change. It is understood that this reconfiguration may be a reconfiguration to combination of parameters that were previously used immediately before the deployed change. Alternatively, this reconfiguration may be a reconfiguration to a combination of parameters that were not previously used immediately before the deployed change. In this latter case, the Network Automation Function 901 may determine a new combination of parameters for the reconfiguration. This determination may be performed in a number of different ways. For example, this determination may be performed solely by the Network Automation Function 901, by the Network Automation Function 901 in combination with the Control Coordination and Configuration Function 903, or by the mechanism illustrated with respect to FIG. 8.

The NACEF may aggregate the received feedback/criticism in a number of different ways. For example, the NACEF may use a machine learning model to evaluate received AQIs. As another example, the NACEF may utilise rule-based constraint checking.

The NACEF may be implemented as a standalone function that the interfaces the Control Coordination and Configuration Function. It may however also be implemented as module within the Control Coordination and Configuration Function, in which case the Control Coordination and Configuration Function then needs to implement the registration interface besides the at least one interface with the plurality of NACFs.

The NACFs may form their feedback/criticism based on at least one of a plurality of different mechanisms. For example, an NACF may use a value range allowed for a Configuration Management (CM) parameter. As another example, an NACF may use rule-based constraint such as, for example, using Constraint Description Language (CDL). As another example, an NACF may use a machine learning model that learns the feedback of different actions. As another example, an NACF may use a stateful machine learning model such as, for example, a Long-Short Term Memory (LSTM) Recurrent Neural Network (RNN), which takes also the temporal context into account in its feedback.

Although the NACEF and NACF are depicted and described separately in the above, it is understood that an NACEF may be an NACF itself, and/or be nested within an NACF. This is because an NACEF may be considered to be a specialist type of NACF. This means that an NACEF may also provide feedback on a deployed and/or requested change, which is then aggregated with feedback provided by at least one other NACF before the aggregated result is provided to the controller.

Both the registration interface(s) and the feedback interface(s) may be standardized to enable the operators to design and attach their own NACFs. The standardized interfaces would allow operators to buy NACFs from different vendors and to dynamically deploy the NACFs. Requesting feedback from neighboring base station may be enabled over Xn interface.

in view of the above, the NACEF and its interfaces (i.e. the registration interface(s) and the feedback interface(s)) may provide a method for dynamically introducing new constraints and coordination logic into a cognitive autonomous network without having to define the constraints and coordination up-front. NACFs may be implemented by third parties and dynamically deployed into the Control Coordination and Configuration Function at an operation time. NACFs may be of different complexity, from simple value ranges to rules to more complex learning functions monitoring the network and having an internal state.

The NACEF and its interfaces therefore introduce a way of introducing smart context-aware constraints and pre-action coordination methods into cognitive networks in multi-domain and multi-vendor systems. Certain components may thus allow integration of third party NACFs, even when they do not allow third party network automation functions.

A description of at least some of the functions performed by an apparatus for the NACEF is generally provided with respect to FIG. 10. It is understood that this description is not limiting.

At 1001, the NACEF receives, from a configuration controller, a request for feedback on a network configuration in a communications network. The network configuration may not yet have been deployed in the communications network. The network configuration may already have been deployed in the communication network.

At 1002, the NACEF requests feedback on the network configuration from a plurality of network critic functions.

At 1003, the NACEF aggregates feedback received from at least part of the plurality of network critic functions in response to the request. In other words, the NACEF may aggregate feedback received from all or only some of the plurality of network critic functions in response to the request. The NACEF may make a determination as to when to aggregate feedback. For example, the NACEF may implement a time limit by which it aggregates feedback regardless of whether or not feedback has been received from all of the network critic functions.

The aggregating may weight feedback received from different network critic functions differently to form the aggregated feedback.

At 1004, the NACEF may provide the aggregated feedback to the configuration controller.

The NACEF may receive a registration request for registering a network critic function, the registration request comprising a scope of feedback that may be provided by said network critic function. The NACEF may cause the said network critic function to be registered with said scope. This registration may be stored in a manner that is accessible to the NACEF for later selection of the said network critic function to provide feedback on a network change. In other words, the NACEF may select said network critic function to be as part of the plurality of network critic functions in dependence on said scope.

The NACEF may generate feedback on the network configuration to form generated feedback. The aggregating in 1003 may, in such a case, aggregate the received feedback with the generated feedback to form the aggregated feedback The NACEF may implement an interface to the controller via which the request for feedback on a network configuration in a communications network is received. In this way, the configuration controller can request feedback from only one single NACEF via its NACES interface. That is the highest level NACEF in case there are nested NACEFs.

The NACEF may implement a registration interface to the plurality of network critic functions.

The NACEF may implement a feedback interface to the plurality of network critic functions for requesting feedback on the network configuration from a plurality of network critic functions.

The feedback received from each of the at least part of the plurality of network critic functions in response to the request may comprise a respective value indicating how a particular action deployed or to be deployed by a first network automation function in the communications network has or will affect the network conditions of other network automation functions in the communications network.

Figure 2:
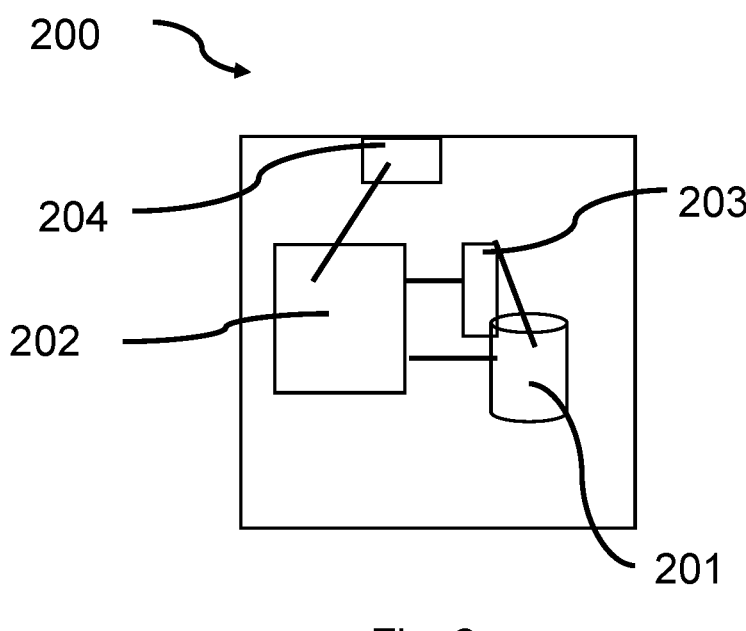
FIG. 2 shows a schematic representation of a network apparatus.

FIG. 2 shows an example of a control apparatus for a communication system, for example to be coupled to and/or for controlling a station of an access system, such as a RAN node, e.g. a base station, gNB, a central unit of a cloud architecture or a node of a core network such as an MME or S-GW, a scheduling entity such as a spectrum management entity, or a server or host, for example an apparatus hosting an NRF, NWDAF, AMF, SMF, UDM/UDR etc. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. The control apparatus 200 can be arranged to provide control on communications in the service area of the system. The apparatus 200 comprises at least one memory 201, at least one data processing unit 202, 203 and an input/output interface 204. Via the interface the control apparatus can be coupled to a receiver and a transmitter of the apparatus. The receiver and/or the transmitter may be implemented as a radio front end or a remote radio head. For example the control apparatus 200 or processor 201 can be configured to execute an appropriate software code to provide the control functions.

Figure 3:
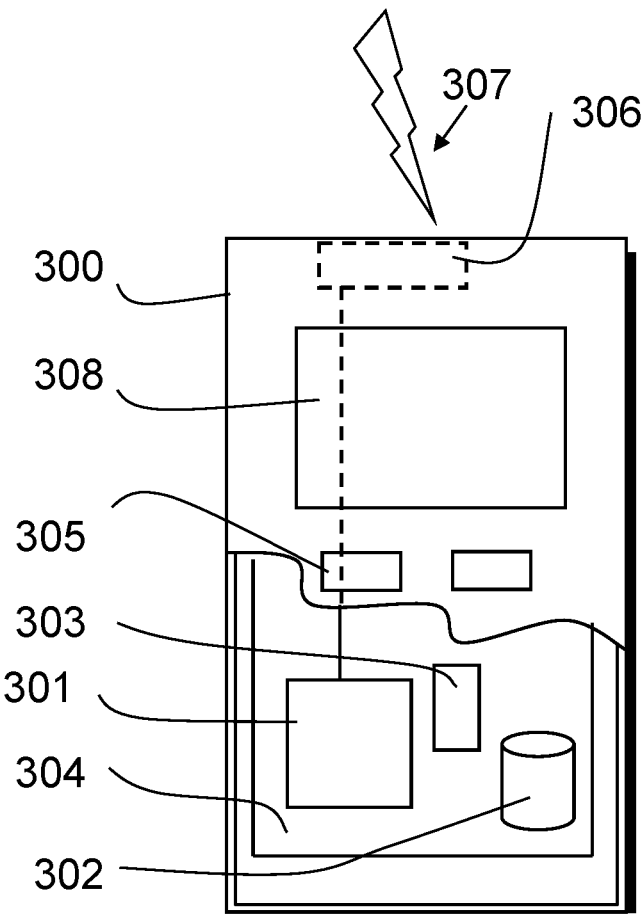
FIG. 3 shows a schematic representation of a user equipment.

A possible wireless communication device will now be described in more detail with reference to FIG. 3 showing a schematic, partially sectioned view of a communication device 300. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. In the present teachings the terms UE or "user" are used to refer to any type of wireless communication device.

The wireless device 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the wireless device.

A wireless device is typically provided with at least one data processing entity 301, at least one memory 302 and other possible components 303 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 704. The user may control the operation of the wireless device by means of a suitable user interface such as key pad 305, voice commands, touch sensitive screen or pad, combinations thereof or the like. A display 308, a speaker and a microphone can be also provided. Furthermore, a wireless communication device may comprise appropriate connectors (either wired or wireless) to other devices and/or for connecting external accessories, for example hands-free equipment, thereto.

Figure 4:
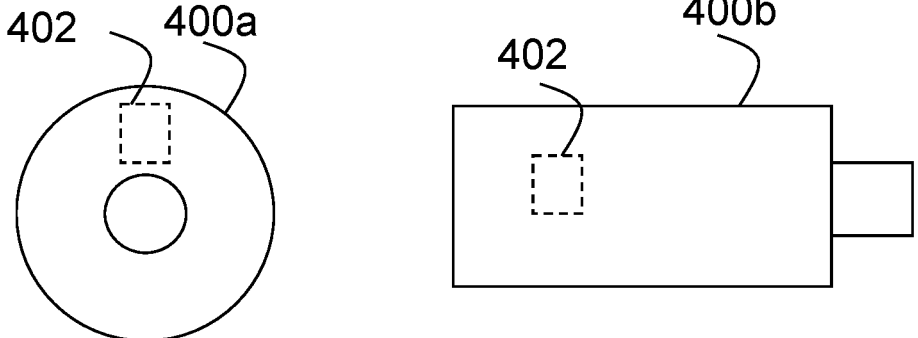
FIG. 4 shows a schematic representation of a non-volatile memory medium storing instructions which when executed by a processor allow a processor to perform one or more of the steps of the methods of some embodiments.

FIG. 4 shows a schematic representation of non-volatile memory media 400*a* (e.g. computer disc (CD) or digital versatile disc (DVD)) and 400*b* (e.g. universal serial bus (USB) memory stick) storing instructions and/or parameters 402 which when executed by a processor allow the processor to perform one or more of the steps of the methods of FIG. 10.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., as in FIG. 10, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:

(a) hardware-only circuit implementations (such as implementations in only analogue and/or digital circuitry);

(b) combinations of hardware circuits and software, such as:

(i) a combination of analogue and/or digital hardware circuit(s) with software/firmware and (ii) any portions of hardware processor(s) with software (including digital signal processor(s)), software, and memory(ies) that work together to cause an apparatus, such as the communications device or base station to perform the various functions previously described; and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments. However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. A network apparatus, comprising:

at least one processor; and at least one memory storing instructions that, when executed by the at least one processor, cause the network apparatus to perform:

implementing an interface to a configuration controller via which a request for feedback on a network configuration in a communications network is received;

implementing a registration interface to a plurality of network critic functions;

implementing a feedback interface to the plurality of network critic functions for requesting feedback on the network configuration from the plurality of network critic functions;

receiving, from the configuration controller, the request for feedback on the network configuration in the communications network, wherein the network configuration has not yet been deployed in the communications network, wherein the request for feedback comprises:

information on a scope for reconfiguration to be performed, an indication of parameters proposed for reconfiguration, wherein the indication of parameters includes current values and proposed new values, a deployment plan for reconfiguration, and a time by which a response to the request for feedback is required;

receiving a registration request for registering a network critic function, the registration request comprising a scope of feedback that may be provided by the network critic function; and causing the said network critic function to be registered with the scope;

selecting the network critic function to be as part of the plurality of network critic functions in dependence on the scope;

requesting feedback on the network configuration from the plurality of network critic functions, wherein each network critic function of the plurality of network critic functions is a Network Automation Function;

generating feedback on the network configuration to form generated feedback;

aggregating feedback received from at least part of the plurality of network critic functions in response to the request, wherein the aggregating weights feedback received from different network critic functions differently to form the aggregated feedback, wherein the aggregating feedback comprises aggregating the received feedback with the generated feedback, and wherein the feedback received from each of the at least part of the plurality of network critic functions in response to the request comprises a respective value indicating how a particular action deployed or to be deployed by a first network automation function in the communications network has or will affect the network conditions of other network automation functions in the communications network; and providing the aggregated feedback to the configuration controller.

\*   \*   \*   \*   \*